US010858999B2

(12) United States Patent
Marconi et al.

(10) Patent No.: US 10,858,999 B2
(45) Date of Patent: Dec. 8, 2020

(54) REMOVABLE PACK FOR REACTIVATING A TURBOSHAFT ENGINE, ARCHITECTURE FOR A MULTI-ENGINE SYSTEM FOR PROPELLING A HELICOPTER, PROVIDED WITH SUCH A PACK, AND CORRESPONDING HELICOPTER

(71) Applicant: SAFRAN HELICOPTER ENGINES, Bordes (FR)

(72) Inventors: Patrick Marconi, Gelos (FR); Romain Thiriet, Jurancon (FR); Camel Serghine, Boeil-bezing (FR); Caroline Seve, Pau (FR); Pierre Darfeuil, Idron (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 484 days.

(21) Appl. No.: 15/519,804

(22) PCT Filed: Oct. 14, 2015

(86) PCT No.: PCT/FR2015/052765
§ 371 (c)(1),
(2) Date: Apr. 17, 2017

(87) PCT Pub. No.: WO2016/062943
PCT Pub. Date: Apr. 28, 2016

(65) Prior Publication Data
US 2017/0241347 A1    Aug. 24, 2017

(30) Foreign Application Priority Data
Oct. 20, 2014    (FR) ..................... 14 60074

(51) Int. Cl.
*F02C 7/277*    (2006.01)
*F02C 7/32*    (2006.01)
(Continued)

(52) U.S. Cl.
CPC .............. *F02C 7/277* (2013.01); *B64C 27/14* (2013.01); *B64D 27/10* (2013.01); *F02C 7/268* (2013.01);
(Continued)

(58) Field of Classification Search
CPC .. F02C 7/277; F02C 7/26; F02C 7/262; F02C 7/268; F02C 7/275; F02C 7/32; F02C 7/36; F05D 2220/329
See application file for complete search history.

(56) References Cited

U.S. PATENT DOCUMENTS 4,064,690 A * 12/1977 Kronogard .............. F02C 3/103
60/792
4,077,202 A * 3/1978 Schutze .................. B64D 41/00
60/788
(Continued)

FOREIGN PATENT DOCUMENTS

EP    1953899 A1    8/2008
EP    2581586 A2    4/2013
(Continued)

OTHER PUBLICATIONS

International Search Report with English language translation, dated Feb. 3, 2016, International Application No. PCT/FR2015/052765.

*Primary Examiner* — Steven M Sutherland
(74) *Attorney, Agent, or Firm* — Womble Bond Dickinson (US) LLP

(57) ABSTRACT

The invention relates to a removable reactivation pack for a turboshaft engine of a helicopter, comprising a gas generator equipped with a drive shaft, said turboshaft engine (6) being capable of operating in at least one standby mode during a stable flight of the helicopter, said removable pack comprising: a removable gearbox comprising a gearbox output shaft; controlled means for rotating said gearbox output shaft,
(Continued)

Figure 1:
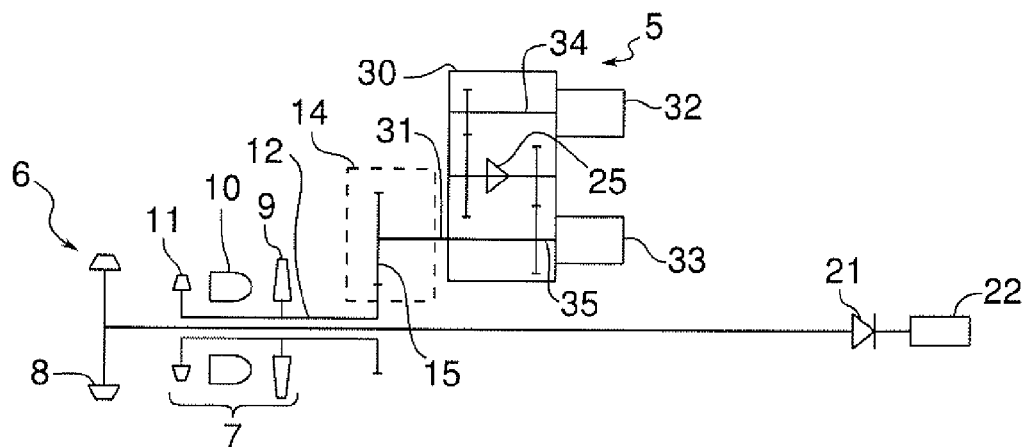

referred to as reactivation means of said turboshaft engine; mechanical means for reversibly coupling said gearbox output shaft to said drive shaft of said gas generator.

13 Claims, 1 Drawing Sheet

(51) Int. Cl.
*F02C 7/275* (2006.01)
*F02C 7/268* (2006.01)
*B64C 27/14* (2006.01)
*B64D 27/10* (2006.01)
*F02C 7/36* (2006.01)

(52) U.S. Cl.
CPC ............ *F02C 7/275* (2013.01); *F02C 7/32* (2013.01); *F02C 7/36* (2013.01); *F05D 2220/329* (2013.01); *F05D 2220/50* (2013.01); *Y02T 50/60* (2013.01)

(56) References Cited

U.S. PATENT DOCUMENTS

| | | | |
|---|---|---|---|
| 2006/0087123 A1* | 4/2006 | Stout | F02C 7/268 |
| | | | 290/2 |
| 2008/0238098 A1* | 10/2008 | Becquerelle | H02K 7/116 |
| | | | 290/3 |
| 2012/0122631 A1 | 5/2012 | Galivel et al. | |
| 2013/0086919 A1* | 4/2013 | Dooley | F02C 7/26 |
| | | | 60/778 |
| 2013/0219905 A1* | 8/2013 | Marconi | F02C 6/206 |
| | | | 60/772 |

FOREIGN PATENT DOCUMENTS

| | | |
|---|---|---|
| FR | 1104252 A | 11/1955 |
| FR | 2967133 A1 | 5/2012 |

* cited by examiner

REMOVABLE PACK FOR REACTIVATING A TURBOSHAFT ENGINE, ARCHITECTURE FOR A MULTI-ENGINE SYSTEM FOR PROPELLING A HELICOPTER, PROVIDED WITH SUCH A PACK, AND CORRESPONDING HELICOPTER

1. TECHNICAL FIELD OF THE INVENTION

The invention relates to a reactivation pack for a turboshaft engine of a helicopter which is capable of operating in at least one standby mode during a stable flight of the helicopter, and is referred to as a hybrid turboshaft engine.

The invention also relates to an architecture of a propulsion system of a multi-engine—in particular twin-engine or triple-engine—helicopter equipped with at least one such reactivation pack. The invention also relates to a helicopter comprising a propulsion system having such an architecture.

2. TECHNOLOGICAL BACKGROUND

As is known, a twin-engine or triple-engine helicopter has a propulsion system comprising two or three turboshaft engines, each turboshaft engine comprising a gas generator and a free turbine which is rotated by the gas generator and is rigidly connected to an output shaft. The output shaft of each free turbine is suitable for putting into motion a power transmission casing, which itself drives the rotor of the helicopter.

It is known that the turboshaft engines of the helicopter operate in modes which are dependent on the flight conditions of the helicopter. Throughout the following text, a helicopter is said to be in a cruise flight situation when it is progressing in normal conditions, during all the phases of the flight, apart from transitional phases of take-off, ascent, landing or hovering flight. Throughout the following text, a helicopter is said to be in a critical flight situation when it is necessary for it to have available the total installed power, i.e. during the transitional phases of take-off, ascent, landing and the mode in which one of the turboshaft engines is malfunctioning, referred to by the abbreviation OEI (One Engine Inoperative).

It is known that, when the helicopter is in a cruise flight situation, the turboshaft engines operate at low power levels, below their maximum continuous power. These low power levels give rise to a specific consumption (hereinafter SC), defined as the ratio between the hourly consumption of fuel by the combustion chamber of the turboshaft engine and the mechanical power supplied by this turboshaft engine, greater than around 30% of the SC of the maximum takeoff power, and therefore overconsumption of fuel in cruise flight.

Moreover, the turboshaft engines of a helicopter are designed so as to be oversized in order to be able to keep the helicopter in flight in the event of failure of one of the engines. This flight situation corresponds to the OEI mode described above. This flight situation occurs following the loss of an engine, and results in each functioning engine providing a power that is significantly greater than its rated power in order to allow the helicopter to overcome a dangerous situation, and to then continue its flight.

At the same time, the turboshaft engines are also oversized so as to be able to ensure flight over the entire flight range specified by the aircraft manufacturer, and in particular flight at high altitudes and during hot weather. These flight points, which are very restrictive, in particular when the helicopter has a mass that is close to its maximum take-off mass, are only encountered in specific use cases.

These oversized turboshaft engines are disadvantageous in terms of mass and fuel consumption. In order to reduce this consumption in cruise flight, it is envisaged to put one of the turboshaft engines into standby during flight. The active engine or engines then operate at higher power levels in order to provide all the necessary power, and therefore at more favourable SC levels.

In FR1151717 and FR1359766, the applicants have proposed methods for optimising the specific consumption of the turboshaft engines of a helicopter by means of the possibility of putting at least one turboshaft engine into a stable power mode, known as continuous, and at least one turboshaft engine into a particular standby mode that it can leave in a rapid or normal manner, according to need. Leaving standby mode is said to have occurred normally when a change in the flight situation requires the turboshaft engine in standby to be activated, for example when the helicopter is going to transition from a cruise flight situation to a landing phase. Leaving standby mode normally in this manner occurs over a period of between 10 seconds and 1 minute. Leaving standby mode is said to have occurred rapidly when a failure or power deficit of the active engine occurs or when the flight conditions become suddenly difficult. Leaving standby rapidly in this manner occurs over a period of less than 10 seconds.

A turboshaft engine leaves a standby mode by means of a turboshaft engine reactivation pack.

The applicant has already proposed a number of reactivation packs for a hybrid turboshaft engine. For example, this reactivation pack can comprise an energy storage device such as an electrochemical store of the lithium ion battery type or an electrostatic store of the supercapacitor type, which allows the turboshaft engine to be provided with the energy required for reactivation and for rapidly reaching a nominal operation mode. According to another proposal by the applicant, this pack comprises a gas generator having a solid propellant that is suitable for activating a turbine for driving the shaft of the turboshaft engine.

All of the solutions proposed for reactivating a turboshaft engine in standby mode have the disadvantage of increasing the weight of the turboshaft engine. The benefit in terms of fuel consumption obtained by placing the turboshaft engine in standby is thus partly lost by the excess weight caused by the reactivation pack.

Moreover, during its lifetime, a helicopter may carry out different types of missions, some of which do not allow the hybrid turboshaft engine to be put into standby. The hybridisation of a turboshaft engine of this kind, i.e. the ability to put said turboshaft engine into standby and to reactivate it by using a reactivation pack can, therefore, adversely affect the performance of the helicopter for some missions.

Furthermore, a helicopter of which just one turboshaft engine is capable of being put into standby mode may age differently from the other turboshaft engines, thus introducing an imbalance.

The inventors have therefore sought a means for maintaining the performance of a helicopter, irrespective of the missions that it carries out. The inventors have in particular sought to be able to adapt, without major difficulty, a helicopter to the missions that it has to carry out. The inventors have also sought a means for balancing the aging of the turboshaft engines in a helicopter.

3. AIMS OF THE INVENTION

The invention aims to provide a turboshaft engine reactivation pack that can be mounted on a turboshaft engine or removed from the turboshaft engine, according to the flight requirements.

The invention also aims to provide a turboshaft engine reactivation pack that makes it possible to hybridise a turboshaft engine depending on the requirements.

The invention also aims to provide a turboshaft engine reactivation pack that makes it possible to balance the aging of the turboshaft engines of a helicopter.

The invention also aims to provide, in at least one embodiment, an architecture of a propulsion system of a helicopter equipped with a reactivation pack according to the invention.

4. DISCLOSURE OF THE INVENTION

In order to achieve this, the invention relates to a removable pack for the reactivation of a turboshaft engine of a helicopter, comprising a gas generator equipped with a shaft, said turboshaft engine being capable of operating in at least one standby mode during a stable flight of the helicopter, said removable pack comprising:
  a removable casing comprising a casing output shaft;
  controlled means for rotating said casing output shaft, referred to as reactivation means of said turboshaft engine,
  mechanical means capable of reversibly coupling said casing output shaft to said drive shaft of said gas generator.

Furthermore, according to the invention, said reactivation means of said turboshaft engine comprise at least:
  a first reactivation device that is mounted on said casing and comprises a shaft that is referred to as the first casing input shaft and is mechanically connected to said casing output shaft, and controlled means for rotating said first casing input shaft so as to be able to rotate said output shaft,
  a second reactivation device that is mounted on said casing and comprises a shaft that is referred to as the second casing input shaft and is mechanically connected to said output shaft, and controlled means for rotating said second casing input shaft so as to be able to rotate said output shaft.

The invention thus makes it possible to hybridise a turboshaft engine on demand, i.e. to allow the turboshaft engine to be put into standby mode by providing a turboshaft engine reactivation pack if necessary, said pack being removable. The pack comprises a removable casing, the output shaft of which is coupled to the shaft of the gas generator using reversible coupling means. The shaft of the casing can therefore be coupled to the gas generator of a turboshaft engine when it is desired to hybridise said turboshaft engine. A removable reactivation pack according to the invention thus makes it possible to mount the pack on a turboshaft engine only when a flight undertaken by a helicopter equipped with this turboshaft engine is of a type that may encounter a flight phase during which said turboshaft engine can be put into standby mode. Moreover, during a mission of this kind, it is possible to select the turboshaft engine on which the removable pack is mounted, such that the aging rates of the different turboshaft engines of a helicopter can be harmonised. The aim of harmonising these aging rates may for example be that of matching the maintenance dates of the different turboshaft engines of a helicopter in order to limit the immobilisation time of the helicopter. The removable reactivation pack is removed from the turboshaft engine for all the flights where standby mode is impossible a priori, and this prevents the helicopter from being disadvantaged by unnecessary excess weight. A turboshaft engine reactivation pack can also be mounted on different turboshaft engines, and thus on different helicopters. The same pack can therefore contribute to the hybridisation of different turboshaft engines of different helicopters.

Furthermore, the turboshaft engine reactivation means comprise two reactivation devices, each device being mounted and supported by the removable casing. Mounting the removable casing on/removing said casing from the turboshaft engine using the reversible coupling means thus eliminates the mounting/removal of the turboshaft engine reactivation devices. A reactivation pack according to the invention thus forms a ready-to-use pack (better known by the term "plug and play"). Each reactivation device further comprises means for rotating an input shaft in the removable casing that is mechanically connected to the casing output shaft. This architecture thus forms two independent units, each unit being formed by a reactivation device and being able to be replaced independently of one another.

Advantageously and according to the invention, said means for reversibly coupling said casing output shaft to said drive shaft of said gas generator are formed by an accessory casing of said turboshaft engine.

According to this variant, the removable pack is coupled to the drive shaft of the gas generator of the turboshaft engine by means of an accessory casing of the turboshaft engine. A turboshaft engine accessory casing comprises, for example, a set of pinions that drive the ancillaries necessary for the operation of the gas generator of the turboshaft engine, and optionally equipment specific to the helicopter, such as air conditioning units or any other accessory. According to this variant, the removable casing output shaft is meshed, in a reversible manner, with a pinion of the accessory casing.

Advantageously and according to the invention, said controlled means for rotating said first casing input shaft of said first reactivation device are capable of driving said first input shaft at a predetermined speed for a period that is less than the period required for said means for rotating said second input shaft of said second reactivation device to drive said second input shaft at a predetermined speed, said first reactivation device thus forming a device for rapid reactivation of said turboshaft engine, and said second reactivation device forming a device for normal reactivation of said turboshaft engine.

According to this variant, the two reactivation devices have distinct features. In particular, the first reactivation device allows rapid reactivation of the turboshaft engine, for example when the full power of the turboshaft engine in standby is urgently required on account of failure of another turboshaft engine. The second reactivation device allows normal reactivation of the turboshaft engine, for example when the helicopter is going to transition from a cruise or economical flight situation to a landing phase in which the full power of the engines is required.

Advantageously and according to the invention, said means for rotating said rapid reactivation device comprise a generator having a solid propellant, a pneumatic turbine that is connected to a pneumatic store, a hydraulic turbine that is connected to a hydropneumatic store, or an electrical machine that is connected to an electrical energy store.

Advantageously and according to the invention, the removable coupling casing comprises an intermediate shaft that carries a first intermediate pinion that is meshed with a ring gear carried by said first casing input shaft, and a second intermediate pinion that is meshed with a ring gear carried by said second casing input shaft, said casing output shaft being coupled to said second casing input shaft.

This architecture of the removable casing makes it possible, for example, to reduce or increase the speed of the rapid reactivation chain by selecting suitable gear ratios. The first input shaft and the second input shaft are preferably parallel so as to each form, together with the associated reactivation device, an independent unit that can optionally be replaced independently of the other unit.

Advantageously and according to this variant, the first intermediate pinion is mounted on said intermediate shaft by means of a free wheel that is designed and oriented so as to be able to rotate said intermediate shaft if said first input shaft is rotated.

The free wheel makes it possible to transfer the mechanical power of the first input shaft, which is transmitted by the rapid reactivation device, to the intermediate shaft. The intermediate shaft then transmits the received mechanical power to the output shaft by means of the first input shaft that is mechanically connected to said intermediate shaft. In contrast, the power transmitted to the intermediate shaft by means of the second input shaft is not transmitted to the first input shaft by means of the free wheel because said wheel slides. This makes it possible to protect the rapid reactivation chain. Furthermore, an architecture of this kind ensures that, when rapid reactivation is required, the power is always transmitted to the turboshaft engine, even if the normal reactivation device is also active. In other words, the rapid reactivation chain overrides the normal reactivation chain.

According to another variant, the casing may comprise two intermediate shafts, a first intermediate shaft that carries the first intermediate pinion that is meshed with the pinion carried by said first casing input shaft, and a second intermediate shaft that carries the second intermediate pinion that is meshed with the pinion carried by said second casing input shaft, the two intermediate shafts being mechanically interconnected, for example by means of a free wheel.

Advantageously and according to the invention, the removable casing comprises a sealed casing that comprises a lubrication opening in order to allow lubrication of the mechanisms of said removable casing.

The invention also relates to an architecture of a propulsion system of a multi-engine helicopter comprising turboshaft engines connected to a power transmission casing, characterised in that it comprises:
- at least one turboshaft engine from said turboshaft engines, referred to as a hybrid turboshaft engine, which is capable of operating in at least one standby mode during a stable flight of the helicopter, the other turboshaft engines operating alone during this stable flight,
- a removable turboshaft engine reactivation pack according to the invention, which is mounted on said hybrid turboshaft engine so as to make it possible for said hybrid turboshaft engine to leave a standby mode on demand.

The invention also relates to a helicopter comprising a propulsion system, characterised in that said propulsion system has an architecture according to the invention.

The invention also relates to a removable turboshaft engine reactivation pack, to an architecture of a propulsion system of a multi-engine helicopter, and to a helicopter equipped with a propulsion system having an architecture of this kind, characterised in combination by all or some of the features mentioned above or in the following.

5. LIST OF DRAWINGS

Figure 2:
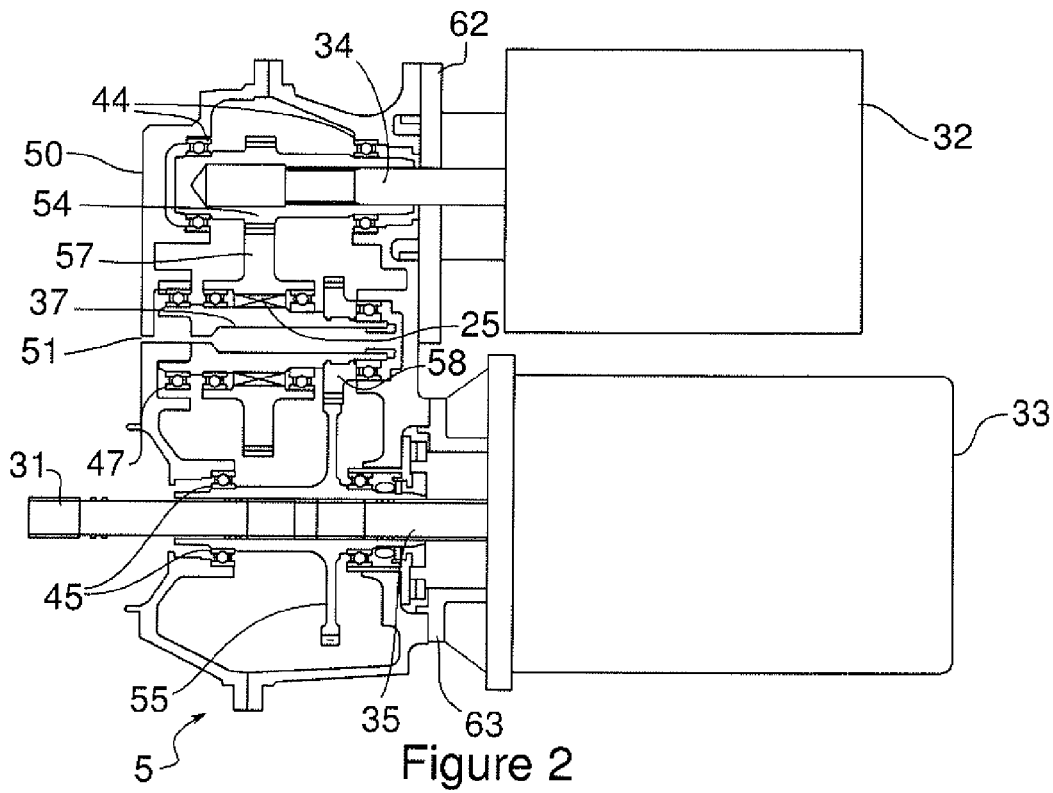
Figure 3:
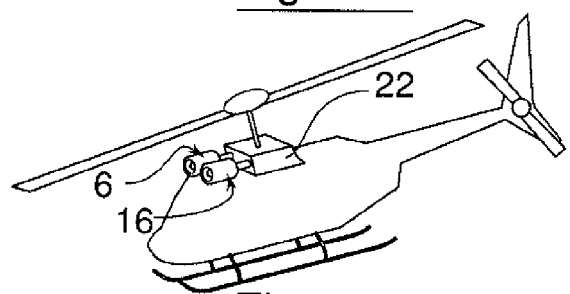

Other aims, features and advantages of the invention will become apparent upon reading the following description, which is given purely by way of non-limiting example and relates to the accompanying drawings, in which:

FIG. 1 is a schematic view of a removable turboshaft engine reactivation pack according to an embodiment of the invention and mounted on a turboshaft engine, FIG. 2 is another schematic view of a removable turboshaft engine reactivation pack according to an embodiment of the invention, FIG. 3 is a schematic view of a helicopter comprising a turboshaft engine equipped with a reactivation pack according to an embodiment of the invention.

6. DETAILED DESCRIPTION OF AN EMBODIMENT OF THE INVENTION

In the drawings, the scales and the proportions are not respected for the sake of illustration and clarity.

FIG. 1 is a schematic view of a removable turboshaft engine reactivation pack 5 according to an embodiment of the invention and mounted on a turboshaft engine 6 of a helicopter.

Said turboshaft engine 6 comprises a gas generator 7 and a free turbine 8 that is rotated by the gases produced by the gas generator 7. For this purpose, the gas generator 7 comprises an air compressor 9 that is supplied with air by an air inlet (not shown in the drawings). The compressor 9 supplies a fuel, in the compressed air, to a combustion chamber 10, which fuel delivers burned gas that provides kinetic energy. Furthermore, a turbine 11 for partially expanding the burned gas is coupled to the compressor 10 by means of a drive shaft 12 so as to be able to rotate the compressor 10 and the equipment necessary for the operation of the gas generator or the helicopter. The resultant portion of the burned gas drives the free power transmission turbine 8 which is mechanically connected to a power transmission casing 22 by means of a free wheel 21.

The removable pack 5 for reactivating the turboshaft engine 6 comprises a removable casing 30 comprising a casing output shaft 31, a device 32 for rapid reactivation of the turboshaft engine 6 that is mounted on the casing 30, and a device 33 for normal reactivation of the turboshaft engine 6 that is mounted on the casing 30. The rapid reactivation device 32 further comprises a casing input shaft that is referred to as the first casing input shaft 34 and is mechanically connected to the output shaft 31 by means of a system of gears that is described in detail in relation to FIG. 2. The normal reactivation device 33 also comprises a casing input shaft that is referred to as the second casing input shaft 35 and is also connected to the casing output shaft 31 by means of a system of gears that is described in relation to FIG. 2.

The reactivation pack further comprises means for reversibly coupling the casing output shaft 31 to the drive shaft 12 of the gas generator 7. These means are formed by an accessory casing 14 of the turboshaft engine 6. In other words, the output shaft 31 can be coupled to/disconnected from a pinion 15 of the accessory casing 14 of the turboshaft engine 6.

A reactivation pack according to the invention can therefore be easily mounted on/removed from a turboshaft engine 6 depending on the requirements of the mission of the helicopter on which the turboshaft engine 6 is installed. Furthermore, the turboshaft engine 6 and the turboshaft engine reactivation devices 32, 33 are controlled by a dedicated inspection-control device, which is not shown in the drawings for reasons of clarity.

FIG. 2 is a detailed view of an architecture of the casing 30 and in particular of the system of gears mechanically connecting the input shaft 34 of the rapid reactivation device 32 and the input shaft 35 of the normal reactivation device 33 to the casing output shaft 31. The casing 30 comprises a casing 50 in which the system of gears is housed. Each reactivation device comprises a plate 62, 63 that is fixed to the casing 50 by screw/nut means, which are not shown in the drawings for reasons of clarity.

Said system of gears comprises the shaft 34 that is mounted on bearings 44 supported by the casing 50, and the shaft 35 that is mounted on bearings 45 supported by the casing 50. The shafts 34 and 31 are parallel and have a centre-to-centre distance that is, for example, less than 200 mm so as to form a compact casing that can be easily handled by an operator during operations for mounting/removing the pack. The shaft 34 further comprises a ring gear 54 that is meshed with a pinion 57 carried by an intermediate shaft 37. Said intermediate shaft 37 is mounted on bearings 47 of the casing 50. According to the embodiment in the drawings, the pinion 57 is mounted on the intermediate shaft 37 by means of a free wheel 25. The intermediate shaft 37 further comprises a pinion 58 that is meshed with the ring gear 55 of the shaft 35 connected to the normal reactivation device 33. The free wheel 25 is oriented such that a rotation of the shaft 34 causes a rotation of the intermediate shaft 37, which shaft itself rotates the shaft 35. In contrast, rotating the intermediate shaft 37 by means of the shaft 35 does not rotate the shaft 34. In this configuration, the free wheel 25 slides.

The casing 50 further comprises an opening 51 for lubricating the system of gears. This makes it possible to simultaneously lubricate the pinions, the ring gears and the free wheel of the system of gears.

Each reactivation device further comprises controlled means for rotating the casing input shaft to which said reactivation device is connected.

For example, the controlled means 32 for rotating the first casing input shaft 34 of the rapid reactivation device comprise a generator having a solid propellant, or a pneumatic turbine connected to a pneumatic store, or a hydraulic turbine connected to a hydropneumatic store, or an electrical machine connected to an electrical energy store. In general terms, these are means suitable for rapidly inducing the movement of said first casing input shaft 34 at a high rotational speed, for example of over 30,000 rotations/minute, in order to rapidly induce the movement of the casing output shaft 31 and thus rapidly reactivate the turboshaft engine 6 to which the reactivation pack is connected.

The controlled means 33 for rotating the second casing input shaft 35 of the rapid reactivation device comprise, for example, a starter/generator suitable for rotating the shaft at a speed of approximately 10,000 to 20,000 rotations/minute.

The invention also relates to an architecture of a propulsion system of a multi-engine helicopter, comprising turboshaft engines 6, 16 that are connected to a power transmission casing 22, as shown in FIG. 3. According to this architecture, a turboshaft engine 6 is equipped, by means of the accessory casing thereof, with a removable reactivation pack as described in relation to FIGS. 1 and 2.

The invention claimed is:

1. A removable pack for the reactivation of a turboshaft engine of a helicopter, comprising a gas generator equipped with a drive shaft, said turboshaft engine being capable of operating in at least one standby mode during a stable flight of the helicopter, said removable pack comprising:
a removable casing comprising a casing output shaft,
a first reactivation device that is mounted on said removable casing and comprises a first casing input shaft and is mechanically connected to said casing output shaft, the first reactivation device comprising a first controlled means for rotating said first casing input shaft,
a second reactivation device that is mounted on said removable casing and comprises a second casing input shaft and is mechanically connected to said output shaft, the second reactivation device comprising a second controlled means for rotating said second casing input shaft,
said first and second controlled means for rotating said casing output shaft,
a coupling mechanical device configured to reversibly couple said casing output shaft to said drive shaft of said gas generator.

2. The removable pack according to claim 1, wherein said coupling mechanical device capable of reversibly coupling said casing output shaft to said drive shaft of said gas generator are formed by an accessory casing of said turboshaft engine.

3. The removable pack according to claim 1, wherein said first controlled means is configured to drive said first casing input shaft at a first predetermined speed for a period that is less than the period required for said second controlled means to drive said second casing input shaft at a second predetermined speed, said first reactivation device thus forming a device for rapid reactivation of said turboshaft engine, and said second reactivation device forming a device for normal reactivation of said turboshaft engine.

4. The removable pack according to claim 3, wherein said first controlled means comprise one of a generator having a solid propellant, a pneumatic turbine that is connected to a pneumatic store, a hydraulic turbine that is connected to a hydropneumatic store, and an electrical machine that is connected to an electrical energy store.

5. The removable pack according to claim 1, wherein said removable casing comprises a sealed casing that comprises a lubrication opening in order to allow lubrication of the mechanisms of said removable casing.

6. An architecture of a propulsion system of a multi-engine helicopter comprising turboshaft engines connected to a power transmission casing, wherein the architecture comprises:
at least one turboshaft engine from said turboshaft engines, is a hybrid turboshaft engine, configured to operate in at least one standby mode during a stable flight of the helicopter, the other turboshaft engines operating alone during the stable flight,
a removable turboshaft engine reactivation pack according to claim 1, which is mounted on said hybrid turboshaft engine so as to make it possible for said hybrid turboshaft engine to leave a standby mode on demand.

7. A helicopter comprising a propulsion system, wherein said propulsion system has the architecture according to claim 6.

8. The removable pack according to claim 1, wherein the first casing input shaft is configured to drive into rotation at least the second casing input shaft and wherein the second casing input shaft is configured to drive into rotation only the casing output shaft which is intended to drive into rotation the drive shaft.

9. The removable pack according to claim 1, wherein said removable casing comprises an intermediate shaft, and wherein a rotation of the first casing input shaft causes a rotation of the intermediate shaft that causes rotation of the second casing input shaft and wherein a rotation of the intermediate shaft by means of the second casing input shaft does not cause a rotation of the first casing input shaft.

10. The removable pack according to claim 9, wherein the intermediate shaft carries a first intermediate pinion that is meshed with a ring gear carried by said first casing input shaft, and a second intermediate pinion that is meshed with a ring gear carried by said second casing input shaft, said casing output shaft being coupled to said second casing input shaft.

11. The removable pack according to claim 10, wherein said first intermediate pinion is mounted on said intermediate shaft by a free wheel that is designed and oriented so as to be able to rotate said intermediate shaft if said first input shaft is rotated.

12. A removable pack for the reactivation of a turboshaft engine of a helicopter, comprising a gas generator equipped with a drive shaft, said turboshaft engine being capable of operating in at least one standby mode during a stable flight of the helicopter, said removable pack comprising:

a removable casing comprising a casing output shaft,
  a first reactivation device that is mounted on said removable casing and comprises a first casing input shaft and is mechanically connected to said casing output shaft, the first reactivation device comprising a first controlled means for rotating said first casing input shaft,
  a second reactivation device that is mounted on said casing and comprises a second casing input shaft and is mechanically connected to said output shaft, the second reactivation device comprising a second controlled means for rotating said second casing input shaft,
said first and second controlled means for rotating said casing output shaft,
a coupling mechanical device configured to reversibly couple said casing output shaft to said drive shaft of said gas generator,
wherein said first controlled means is configured to drive said first input shaft at a first predetermined speed for a period that is less than the period required for said second controlled means to drive said second input shaft at a second predetermined speed, said first reactivation device thus forming a device for rapid reactivation of said turboshaft engine, and said second reactivation device forming a device for normal reactivation of said turboshaft engine.

13. A removable pack for the reactivation of a turboshaft engine of a helicopter, comprising a gas generator equipped with a drive shaft, said turboshaft engine being capable of operating in at least one standby mode during a stable flight of the helicopter, said removable pack comprising:

a removable casing comprising a casing output shaft,
  a first reactivation device that is mounted on said removable casing and comprises a first casing input shaft and is mechanically connected to said casing output shaft, the first reactivation device comprising a first controlled means for rotating said first casing input shaft,
  a second reactivation device that is mounted on said casing and comprises a second casing input shaft and is mechanically connected to said output shaft, the second reactivation device comprising a second controlled means for rotating said second casing input shaft,
said first and second controlled means for rotating said casing output shaft,
a coupling mechanical device configured to reversibly couple said casing output shaft to said drive shaft of said gas generator,
wherein said removable casing comprises an intermediate shaft that carries a first intermediate pinion that is meshed with a ring gear carried by said first casing input shaft, and a second intermediate pinion that is meshed with a ring gear carried by said second casing input shaft, said casing output shaft being coupled to said second casing input shaft.

* * * * *